United States Patent [19]

Emslie et al.

[11] Patent Number: 5,130,668
[45] Date of Patent: Jul. 14, 1992

[54] AMPLIFIER ARRANGEMENT WITH TIME CONSTANT CONTROL

[75] Inventors: Robert J. Emslie, Newbury; Christopher N. Smith, Southampton, both of England

[73] Assignees: Orbitel Mobile Communications Limited, Berkshire; The Plessey Company Limited, Essex, both of England

[21] Appl. No.: 590,221

[22] Filed: Sep. 28, 1990

[30] Foreign Application Priority Data

Sep. 28, 1989 [GB] United Kingdom ............. 8921903

[51] Int. Cl.⁵ .................................................. H03G 3/30
[52] U.S. Cl. ...................................... 330/281; 330/141
[58] Field of Search ............... 330/141, 149, 277, 281, 330/300; 307/264, 572; 455/232, 284, 293, 311

[56] References Cited

U.S. PATENT DOCUMENTS 4,134,079  1/1979  Kohtani ........................... 330/281

FOREIGN PATENT DOCUMENTS 0197708  8/1977  U.S.S.R. ........................... 330/281

Primary Examiner—Steven Mottola
Attorney, Agent, or Firm—Leydig, Voit & Mayer

[57] ABSTRACT

An amplifier arrangement suitable for use in a receiver for use in a telecommunications system is described. The arrangement includes an amplifier and an FET switch arrangement arranged to alter the time constant of the amplifier in dependence upon the incident signal frequency. A balance switch arrangement is arranged such that switching transients of the switch arrangement are cancelled out in the amplifier arrangement.

9 Claims, 2 Drawing Sheets

AMPLIFIER ARRANGEMENT WITH TIME CONSTANT CONTROL

BACKGROUND OF THE INVENTION

This invention relates to amplifier arrangments. The invention has particular, although not exclusive, relevance to amplifier arrangements for use in intermediate frequency (I.F.) receivers for use, for example, in telecommunications systems.

DESCRIPTION OF THE PRIOR ART

FIG. 1 is a schematic circuit diagram of an I.F. receiver for a telecommunications system, the receiver incorporating a conventional amplifier arrangement.

Referring to FIG. 1, incoming radio frequency signals fo are received by an aerial 1, the signals fo being amplified by a pre-amplifier 3 prior to processing by a demodulator 5. The demodulator includes two "processing arms" 6,7, each arm 6,7 being arranged to receive a proportion of the received signals fo. A local oscillator 9 with a quadrature output is provided so that signals in phase quadrature may be produced in arms 6,7 respectively by mixers 11,15. I.F. signals are output from the mixers 11,15 and filtered by low pass filters 17,19 prior to amplification by low frequency amplifiers 21,23. An automatic gain controller 25 is provided to adjust the gain of the amplifiers 21,23.

Amplified signals from the amplifiers 21,23 are coupled to analogue-to-digital converters 27,29 where the amplified signals are digitised. These digitised signals are combined in a Digital Signal Processor (DSP) 30 and data output therefrom.

It will be appreciated that in telecommunications systems a D.C. offset may be produced at the outputs of the mixers 11,15 which can saturate the relevant following amplifier 21 or 23. In order to prevent this A.C. coupling is therefore employed, although this introduces some information loss since modulation information is present at frequencies down to D.C. level. To minimise the loss of information the A.C. time constant needs to be as long as possible, thus lowering the cut-off frequency. A long time constant for the amplifiers 21,23 will, however, mean that the amplifiers will be susceptible to saturation, and furthermore, will take a considerable period of time to recover.

The receiver has the additional problem that for a frequency hopping system as is frequently used in telecommunications systems, the local oscillator 9 must change frequency regularly. The D.C. offsets at the outputs of the mixer 11,15 will be a function of the oscillator frequency, and thus these offsets will change constantly.

It is an object of the present invention to provide an amplifier arrangement wherein the above problems are at least alleviated.

SUMMARY OF THE INVENTION

According to the present invention there is provided an amplifier arrangement for a signal receiver, the arrangement including an amplifier, a first switching means arranged to alter the time constant of the amplifier in dependence upon the incident signal frequency, and balancing means arranged to prevent transient signals produced by the switching means from affecting the performance of the amplifier.

Preferably, the balancing means comprises a second switching means and a control arrangement arranged to switch the first and second switching means simultaneously so as to cancel transients produced by the first switching means.

The first and second switching means preferably each comprise a field effect transistor switching circuit arrangement.

BRIEF DESCRIPTION OF THE DRAWINGS

One embodiment of the present invention will now be described, by way of example only, with reference to the drawings, in which.

DESCRIPTION OF THE PREFERRED EMBODIMENT

Figure 1:
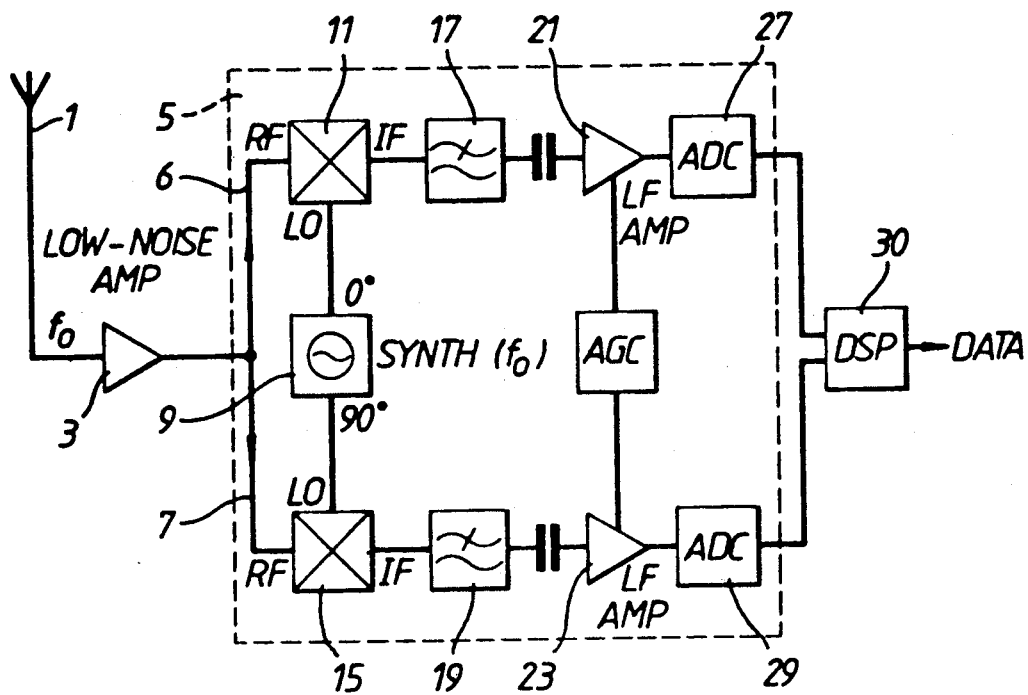
FIG. 1 is a schematic circuit diagram of an IF receiver for a telecommunication system, the receiver incorporating a conventional amplifier arrangement.
Figure 2:
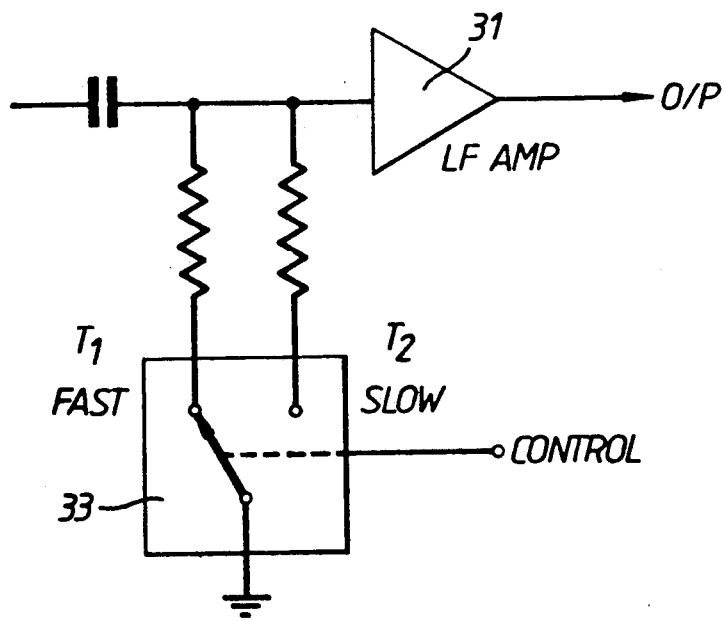
FIG. 2 is a schematic circuit diagram of an amplifier arrangement in accordance with the present invention illustrating the principle of operation of an amplifier arrangement in accordance with the invention.

Referring firstly to FIG. 2, in the embodiment of the invention two amplifier arrangements, each of the form shown in FIG. 2, are substituted in the I.F. stage of a receiver of the form shown in FIG. 1, at the positions of the amplifiers 21,23 in FIG. 1, the rest of the circuit being omitted in FIG. 2 for the sake of clarity. Each amplifier arrangement includes a low frequency (LF) amplifier 31, coupled to which is a switching arrangement 33 which is effective to switch between two time constants T1,T2, these time constants being defined by two different electrical resistance elements 35,37. The choice of time constant T1,T2 is made in dependence upon the signal frequency incident upon the amplifier 31.

It will thus be appreciated that the amplifier 31 illustrated in FIG. 2 may be adapted, by changing its operating time constant, to have a reduced susceptibility to saturation and to have an improved recovery time. After a frequency change at the local oscillator 9, the time constant is reduced so that the amplifier settles quickly. The time constant may then be increased again for normal reception and vice-versa.

Figure 3:
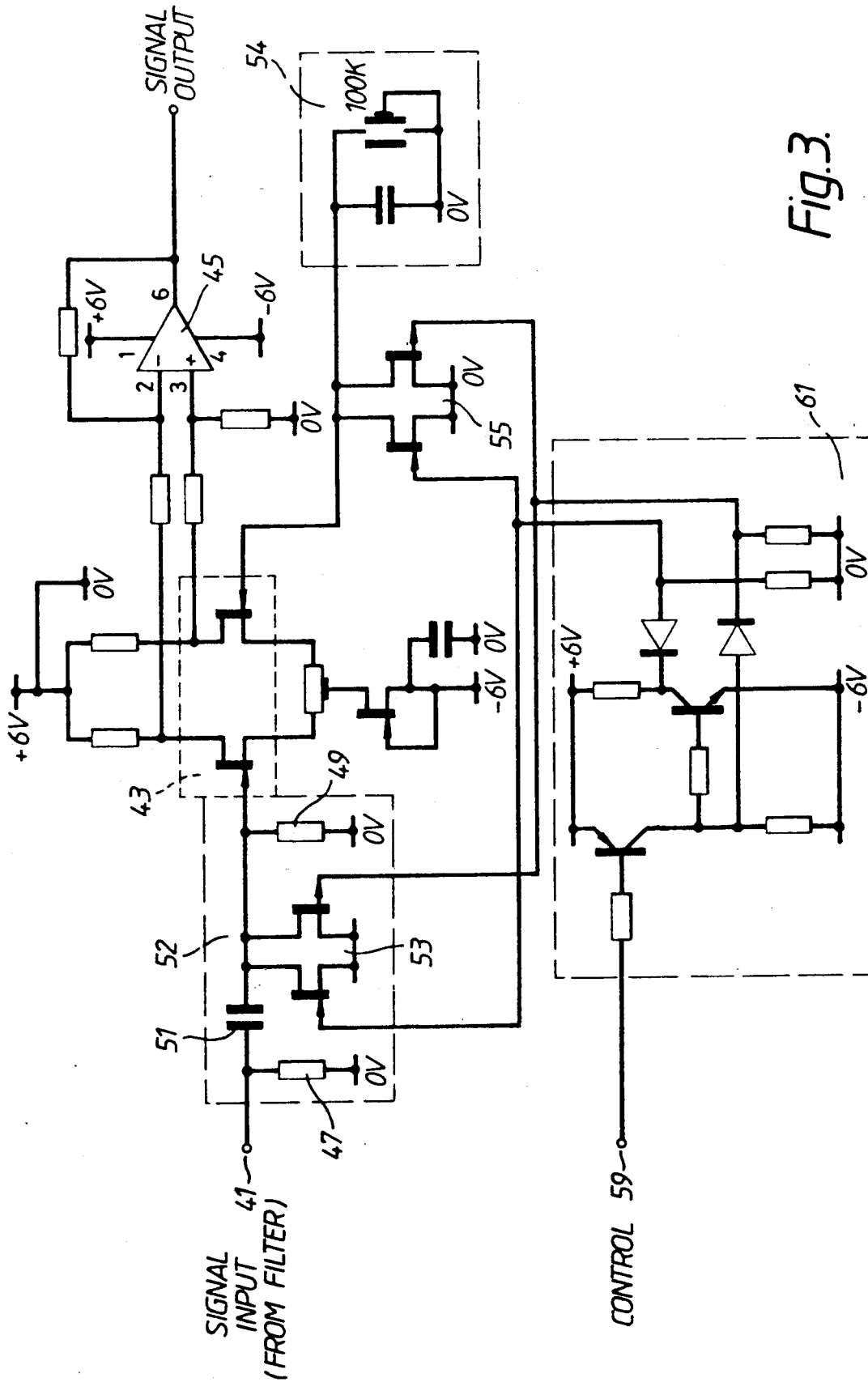
FIG. 3 is a schematic circuit diagram of an embodiment of an amplifier in accordance with the present invention, incorporated in part of a receiver for a telecommunications system.

A problem with the circuit illustrated in FIG. 2 is that there may be switch transients as the amplifier 31 is switched between time constants T1 and T2. These transients could precipitate problems of amplifier saturation and amplifier recovery. In FIG. 3, an amplifier in accordance with the present invention is illustrated where the problems of switch transients are alleviated by the substitution of a differential amplifier 45 for the LF amplifier 31 of FIG. 2, together with the further circuitry described hereafter.

Referring to FIG. 3, this Figure again illustrates one of the amplifier arrangements connected at the positions of the amplifiers 21,23 of the receiver circuit of FIG. 1.

An input signal 41 from the low frequency filter 17 or 19 of FIG. 1 is converted to a complementary signal by a long tail pair of transistors 43. This complementary signal is coupled to a differential amplifier 45 through the transistor drains of the long tail pair 43. It will be appreciated that the time constant of the long tail pair 43, and thus the amplifier 31, is dependent upon input impedance 52 of the long tail pair 43. The input impedance 52 is determined by resistors 47,49, a capacitor 51, and a field effect transistor switch arrangement 53, along with any inherent impedance of the long tail pair 43. The field effect transistor switch arrangement 53 is matched by a balance field effect transistor switch arrangement 55. A variable resistor arrangement 54 is used to optimise switching transient suppression.

The first time constant of the long tail pair 43 and the amplifier 45 is determined by the discrete resistance elements 47 and 49 along with capacitor 51. The impedance of these elements 47,49 and 51 is high thus providing a relatively long time constant.

When there is a change in local oscillator frequency, a control signal 59 is applied to a control arrangement 61 comprising a pair of complementary transistors with the collector of the first transistor connected to the base of the second transistor. This control arrangement 61 is arranged to switch the field effect transistor switch arrangement 53 and balance the field effect transistor switch arrangement 55 simultaneously so as to cancel any switching transients presented at the long tail pair 43 and so eliminate any detrimental effects of these transients at the amplifier 45.

The field effect transistor switch arrangements 53,55 have the effect of "sinking" or reducing the input impedance of the long tail pair 43. Thus, the time constant of the long tail pair 43 and amplifier 45 are reduced making the amplifier 45 more suitable for higher frequency signals.

As the switch arrangement 53 and balance switch arrangement 55 are matched, switching transients are cancelled at the long tail pair 43, and thus the detrimental effect of the switching transients on the receiver is removed.

The width of the control pulse 59 is chosen such that the amplifier 45 settles with the new time constant and thus is stable for the new oscillator frequency.

Any transients caused by switching appears on both inputs 61,63 to the long tailed pair 43, and hence do not affect the output signal 41.

What we claim is:

1. An amplifier arrangement for a signal receiver, the arrangement including an amplifier, a first switching means arranged to alter the time constant of the amplifier in dependence upon the signal frequency of the signals applied to the amplifier, and a balancing means arranged to prevent transient signals produced by the switching means from affecting the performance of the amplifier.

2. An amplifier arrangement according to claim 1 in which the balancing means comprises a second switching means and a control arrangement arranged to switch the first and second switching means simultaneously so as to cancel transients produced by the first switching means.

3. An amplifier arrangement according to claim 2 in which the first and second switching means each comprise a field effect transistor switching circuit arrangement.

4. An amplifier arrangement as claimed in claim 1 wherein the amplifier is a differential amplifier, and the balancing means is effective to cause transient signals produced by the first switching means to be cancelled at the inputs to the differential amplifier.

5. An amplifier arrangement according to claim 4 wherein a long tail pair transistor arrangement is arranged to provide the inputs to the differential amplifier, the respective transistors within the long tail pair being switched by the output of the first switching means and the balancing means respectively.

6. An amplifier arrangement as claimed in claim 1 wherein the first switching means includes variable electrical resistance means, the variable electrical resistance means being arranged to be coupled to the amplifier to alter the amplifier input impedance whereby the amplifier time constant is altered.

7. An amplifier arrangement as claimed in claim 6, wherein the variable electrical resistance means is arranged to provide a plurality of fixed amplifier input impedances.

8. An amplifier arrangement as claimed in claim 6 wherein the variable electrical resistance means includes a field effect transistor switch arrangement to facilitate alteration of the amplifier input impedance.

9. A receiver circuit incorporating an amplifier arrangement, the arrangement including an amplifier, a first switching means arranged to alter the time constant of the amplifier in dependence upon the signal frequency of the signals applied to the amplifier, and a balancing means arranged to prevent transient signals produced by the switching means from affecting the performance of the amplifier.

* * * * *